US011948422B2

(12) United States Patent
Khosla

(10) Patent No.: US 11,948,422 B2
(45) Date of Patent: *Apr. 2, 2024

(54) SYSTEMS AND METHODS OF PREDICTIVE GAMEPLAY

(71) Applicant: Vinod Khosla, Portola Valley, CA (US)

(72) Inventor: Vinod Khosla, Portola Valley, CA (US)

(73) Assignee: Vinod Khosla, Portola Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,429

(22) Filed: May 9, 2022

(65) Prior Publication Data

US 2022/0375299 A1 Nov. 24, 2022

Related U.S. Application Data

(63) Continuation of application No. 17/090,349, filed on Nov. 5, 2020, now Pat. No. 11,354,975.

(60) Provisional application No. 63/087,456, filed on Oct. 5, 2020.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ........ *G07F 17/3227* (2013.01); *G07F 17/323* (2013.01); *G07F 17/3288* (2013.01)

(58) Field of Classification Search

CPC ... G07F 17/32; G07F 17/3211; G07F 17/3214
USPC ............................ 463/12, 16, 20, 25, 40, 42
See application file for complete search history.

(56) References Cited

U.S. PATENT DOCUMENTS

| | | | |
|---|---|---|---|
| 6,080,063 | A | 6/2000 | Khosla |
| 6,287,199 | B1 | 9/2001 | McKeown et al. |
| 6,616,529 | B1 | 9/2003 | Qian et al. |
| 6,726,567 | B1 | 4/2004 | Khosla |
| 7,587,214 | B2 | 9/2009 | Inselberg |
| 8,096,865 | B2 | 1/2012 | Schugar |
| 8,360,835 | B2 | 1/2013 | Strause et al. |
| 8,454,428 | B2 | 6/2013 | Pacey et al. |
| 10,198,899 | B2 | 2/2019 | Yang |
| 10,467,847 | B2 | 11/2019 | Khosla |
| 10,524,008 | B2 | 12/2019 | Green et al. |
| 10,789,804 | B2 | 9/2020 | Khosla |

(Continued)

FOREIGN PATENT DOCUMENTS

| | | | |
|---|---|---|---|
| EP | 1172002 | A1 | 1/2002 |
| WO | WO-2008119065 | A1 | 10/2008 |
| WO | WO-2018/039502 | | 3/2018 |

OTHER PUBLICATIONS

Greg Wyshynski, ESPN, Dec. 4, 2019, How the Blues' predictive gaming app reveals the future of NHL gambling, https://www.espn.com/nhl/story/_/id/28212395/how-blues-predictive-gaming-app-reveals-future-nhl-gambling, accessed Nov. 5, 2020.

(Continued)

*Primary Examiner* — Adetokunbo O Torimiro
(74) *Attorney, Agent, or Firm* — Wilson Sonsini Goodrich & Rosati

(57) ABSTRACT

The present disclosure describes systems and methods for predictive gaming regarding on a live event, such as a live electronic event or an esports event. The systems and methods provide means for users to simultaneously watch a live event and wager on an outcome of the live event.

28 Claims, 4 Drawing Sheets

System
100

(56) References Cited

U.S. PATENT DOCUMENTS

| | | | |
|---|---|---|---|
| 11,308,765 | B2 | 4/2022 | Lockton et al. |
| 11,354,975 | B2 | 6/2022 | Khosla |
| 2005/0044575 | A1 | 2/2005 | Der Kuyl |
| 2007/0087804 | A1 | 4/2007 | Knowles et al. |
| 2007/0207846 | A1 | 9/2007 | Burak et al. |
| 2009/0023489 | A1 | 1/2009 | Toneguzzo |
| 2009/0082096 | A1 | 3/2009 | Ellison et al. |
| 2009/0093290 | A1 | 4/2009 | Lutnick et al. |
| 2010/0271367 | A1 | 10/2010 | Vaden et al. |
| 2011/0281620 | A1 | 11/2011 | Hays |
| 2013/0060362 | A1 | 3/2013 | Murphy et al. |
| 2013/0324239 | A1 | 12/2013 | Ur et al. |
| 2014/0038714 | A1 | 2/2014 | Wei |
| 2014/0221065 | A1 | 8/2014 | Strause et al. |
| 2018/0158286 | A1 | 6/2018 | Strause et al. |
| 2020/0094149 | A1 | 3/2020 | Gonzales |

OTHER PUBLICATIONS

NBC Sports Predictor, https://play.google.com/store/apps/details?id=com.boomfantasy.projectbeta&utm_source=appgrooves&utm_medium=agp_5cb5e22cc4f8627a75cbab96620a0b3a_com.boomfantasy.projectbeta_us_others_16045897540118, accessed Nov. 5, 2020.

Powered by Tally, https://www.playtally.com, accessed Nov. 5, 2020.

SYSTEMS AND METHODS OF PREDICTIVE GAMEPLAY

CROSS-REFERENCE

This application is a continuation of U.S. application Ser. No. 17/090,349, filed Nov. 5, 2020, which claims priority to U.S. Provisional Application No. 63/087,456, filed Oct. 5, 2020, each of which is incorporated herein by reference in its entirety.

BACKGROUND

Sports forecasting has grown in worldwide popularity due to the sophistication of remote live broadcasting, virtual gaming, and data analytics technologies. Predictive gameplay, including those based on sports forecasting, engages both remote and live spectators of a live sporting event by challenging predictive analytical skills based on observed real-time performance. On top of the excitement of live sporting events, predictive gameplay thereby provides an additional layer of fan engagement by fostering social interactions and competition.

INCORPORATION BY REFERENCE

Each patent, publication, and non-patent literature cited in the application is hereby incorporated by reference in its entirety as if each was incorporated by reference individually.

SUMMARY

In some embodiments, the invention provides a method of predictive gaming, the method comprising: a) transmitting to a plurality of users an electronic representation of a live event, wherein the transmitting of the electronic representation of the live event to the plurality of users is synchronous within a margin of error of a human reaction time; and b) receiving from a user of the plurality of users a prediction regarding the live event.

In some embodiments, the invention provides a method of predictive gaming, the method comprising: a) receiving by a user an electronic representation of a live event; b) observing by the user the electronic representation of the live event, wherein the observing by the user is synchronous within a margin of error of no greater than a human reaction time with an observation of the live event by a co-user; and c) transmitting by the user to the co-user a proposition associated with a prediction regarding the live event.

In some embodiments, the invention provides a computer program product comprising a non-transitory computer-readable medium having computer-executable code encoded therein, the computer-executable code adapted to be executed to implement a method of predictive gaming, the method comprising: a) processing a predictive gaming system, wherein the predictive gaming system comprises: i) a streaming module; and ii) a proposition module; b) transmitting by the streaming module to a plurality of users an electronic representation of a live event, wherein the transmitting of the electronic representation of the live event to the plurality of users is synchronous within a margin of error of no greater than a human reaction time; and c) receiving by the proposition module from a user of the plurality of users a proposition associated with a prediction regarding the live event.

DETAILED DESCRIPTION

Figure 1:
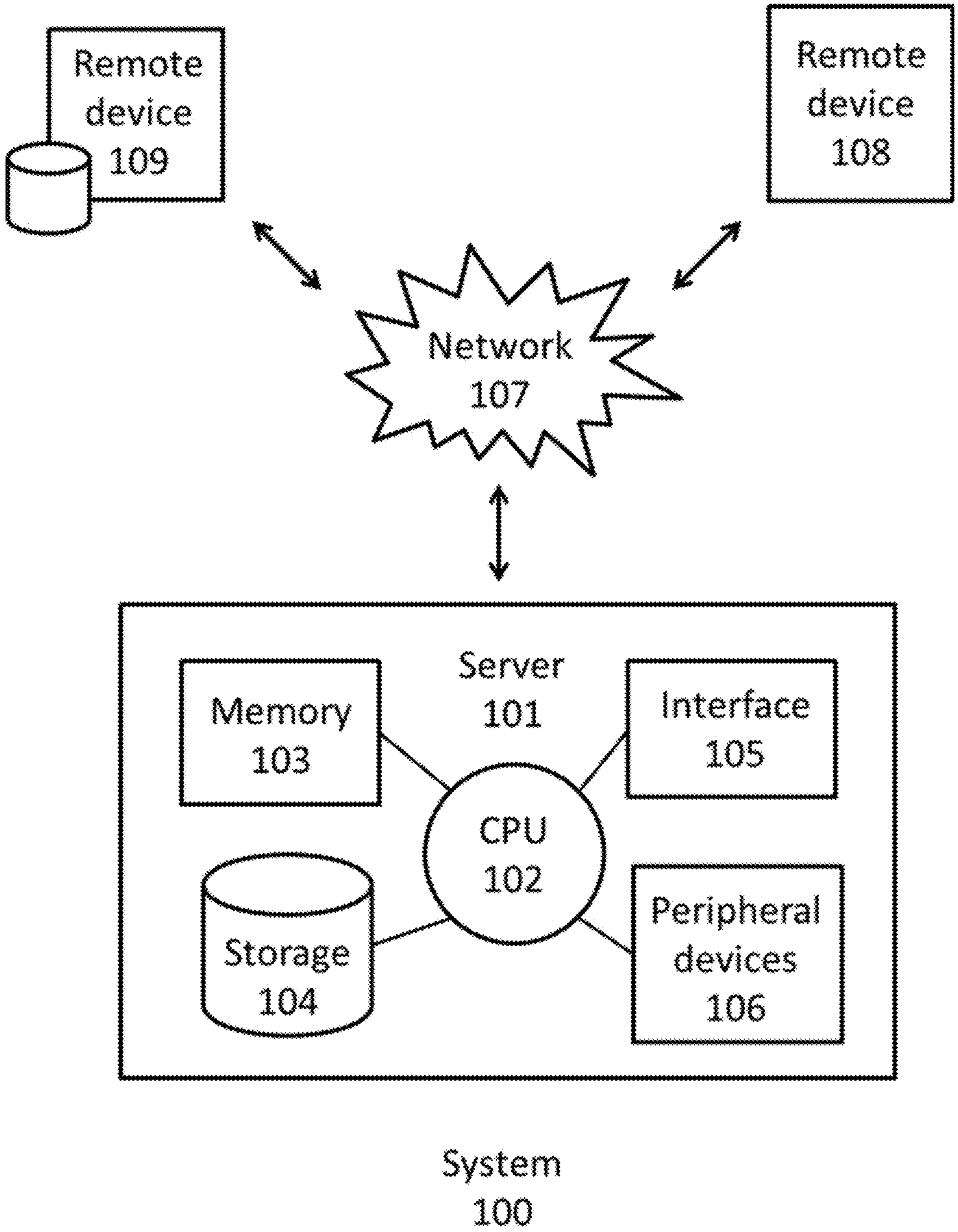
FIG. 1 illustrates a computer system for facilitating methods, systems, products, or devices described herein.

Disclosed herein are methods, systems, and devices for predictive gaming in which an electronic representation of a live event is transmitted to a plurality of users, such that the transmitting of the electronic representation of the live event to the plurality of users is synchronous. The electronic representation of the live event is synchronously transmitted to a plurality of users such that no one user of the plurality of users has access to or knowledge of an outcome of the live event before another user. The synchronous transmission of the electronic representation of the live event can be within a margin of error of human reaction times.

While observing the transmitted representation of the live event, users can participate by submitting a prediction or a proposition associated with a prediction to compete with co-users or the gaming system alone. The gameplay system disclosed herein receives user predictions regarding a live event, for example, a final outcome of the live event. Outcomes regarding the live event can also include a succeeding play in the live event, for example, an action taken by a player participant of the live event, or an action taken by a coach participant of the live event. User predictions can be made on any outcomes regarding the live event depend on the rules of the live event, the user, or the game operator.

In some embodiments, a user observes the electronic representation of the live event such that the observing by the user is synchronous with a co-user. In some embodiments, the user transmits to the co-user a proposition associated with a prediction regarding the live event. The co-user can accept or reject the proposition. If the co-user accepts the proposition, then the user and the co-user compete against one another to determine the correct predictor or winner of the proposition. Accordingly, the system disclosed herein determines the winner of the proposition based on the progression of the live event or an occurrence within the live event.

In some embodiments, the electronic representation of the live event is synchronously transmitted to a plurality of users that are not competing against a (human) co-user. In these embodiments, the plurality of users can compete against a non-human co-user, for example, a virtual robot (bot), the gaming system itself, or the game operator. Nonetheless, the electronic representation of the live event is synchronously transmitted to the plurality of users such that no user has knowledge of an outcome of the live event before another user.

Although a plurality of users of the systems described herein (i.e., players of the predictive game) are provided a play-by-play or real-time broadcast of the live event at the approximately the same time, users can have access to various types of additional or supplemental information to gain potential leverage over other users. Supplemental information can be used to assist users with making a potentially more accurate prediction. Non-limiting examples of supplemental information include statistical information, participant information, event information, and news feeds. Statistical data can include player performance statistics and team performance statistics. Participant information can include age, experience, recent performance, past performance, winning streaks/records, losing streaks/records, undisclosed injuries, personal information, such as participant habits, behaviors, emotions, and psychology (e.g., training regimen, gambling, drinking, illicit drug use, or personal affairs), or any information that may affect the performance of the participant in the live event. Event information can include details about the venue in which the live event takes place, for example, winning streaks/records for a particular venue, conditions of the venue, e.g., weather conditions, and motivation of the participants based on the venue, e.g., a home team may be more motivated than the away team due to home advantage.

Some predictions are based on human predictions, while others are based on computer software simulators or prediction robots (bots). Prediction bots can use different amounts and types of data and algorithms, and thus, can vary in accuracy. The probability of an outcome can be determined using a variety of mathematical formulas, simulation models, or qualitative analyses. Non-limiting examples of algorithms and simulation models include regression analysis, probabilistic models, Bayesian networks, neural networks, machine learning, Markov modeling, and gradient boosting. Nonetheless, there remains a gap between scientific modeling of outcomes and actual real-life outcomes, thereby providing a critical element of uncertainty in the game.

Live Event Broadcasting

Broadcasting of the live event and the predictive gameplay therefrom occur through a mobile or remote environment. Live events, such as sporting events, can have video surveillance systems and environmental sensors that record conditions of a live event in real-time. Audio, video, and other sensory inputs can provide information about a live event, which can be processed through a computer processor to generate a virtual display of conditions of the live event. For example, in a horse racing competition, the actual positions and physical state of the horses can be generated to an electronic display for the duration of the race. Environmental sensors located at the horse race can gather information about the live event, including, for example, venue information, participant status information, participant position information, participant behavior information, event conditions, e.g., temperature, date, time, wind velocity, atmospheric pressure, humidity, and weather conditions. Audio microphones and video cameras can record and electronically stream data through a network. Data from the network can then be transmitted to a plurality of users of the system. In some embodiments, streaming of live events to a plurality of users is in real-time or near real-time. In some embodiments, the live event and the streaming thereof to user are essentially simultaneous or contemporaneous.

As described, a predictive gameplay system disclosed herein synchronously broadcasts a live event to a plurality of users. In some embodiments, the synchronous broadcasting to the plurality of users is within a margin of error of human reaction times. Human reaction times relate to the reaction time of human user participants of the predictive game. Synchronous live event broadcasting within a margin of error of human reaction times provides live event information to users before another user is able to react, for example, submit a prediction regarding an outcome within the live event. In this way, users have a relatively unbiased opportunity to make a prediction regarding an outcome because users have access to the live event within approximately the same time.

Human reaction times are generally within the millisecond (msec) range. An average human reaction time is about 180-200 msec seconds to a visual stimulus, about 140-160 msec to an audio stimulus, and about 150 msec to a touch stimulus. Thus, systems disclosed herein synchronously broadcast a live event to a plurality of users within a margin of error of about 100 msec to about 250 msec, for example, 100 msec, 110 msec, 120 msec, 130 msec, 140 msec, 150 msec, 160 msec, 170 msec, 180 msec, 190 msec, 200 msec, 210 msec, 220 msec, 230 msec, 240 msec, or 250 msec.

A live event described herein is a sporting event, a team sporting event, a competition, a tournament, or any event having an outcome that is subject to speculation and prediction. Non-limiting examples of sporting events include basketball, American football, rugby, soccer, golf, hockey, handball, baseball, softball, cricket, tennis, squash, badminton, table tennis, volleyball, polo, water polo, billiards, and bowling. In some embodiments, the live event is a racing competition. Non-limiting examples of racing competitions include running, walking, automobile racing, horse racing, rowing, skiing, speed skating, swimming, and cycling. In some embodiments, the racing competition is a mixed discipline event, for example, biathlons, triathlons, pentathlons, heptathlons, and decathlons. In some embodiments, the live event is a combat sporting event. Non-limiting examples of combat sporting events include fencing, judo, jiu-jitsu, wrestling, boxing, karate, kung fu, muay thai, taekwondo, and mixed martial arts. In some embodiments, the live event is a gambling event, for example, blackjack, poker, baccarat, roulette, and craps. In some embodiments, the live event is a strategic gaming event including, for example, chess. The live sporting event can take place during regular season gameplay, interleague gameplay, or special events, such as the Super Bowl®, the World Cup®, and the Olympic Games®.

In some embodiments, the live event is an esports event. Non-limiting examples of esports events include fighting games (e.g., Super Smash Bro's®, Mortal Kombat®, Street Fighter®, Tekken®), first-person shooters (e.g., Counter-Strike® (CS, CS:GO), Battlefield® (BF), Call of Duty® (CoD), Overwatch® (OW)), third-person shooters, multiplayer online battle arena (e.g., League of Legends® (LoL), Heroes of the Storm® (HotS), Defense of the Ancients® (Dota), Smite®), racing, real-time strategy (e.g., Starcraft® or Warcraft®), and sports games (e.g., FIFA®, Madden NFL®, Rocket League®).

In some embodiments, the live event is a political election or a business decision.

Propositions and Wagers

Systems and methods disclosed herein provide a predictive gaming system for users to compete with human co-users, non-human co-users, or the gaming system itself. While observing a synchronous broadcast of a live event, users can submit predictions or propositions associated with predictions regarding the live event. Users can submit predictions or propositions in real-time (or near real-time) as the live event is being broadcasted. In some embodiments, a proposition is a wager. As predictions are submitted and/or wagers are placed, the system maintains a record of all submissions, wagers, and other user transactions. After the outcome is determined, the system determines the winner(s)

of the proposition. Accordingly, the system credits proposition winners and debits proposition losers. Proposition winners can be granted a prize or reward, for example, a monetary prize, a gift, a voucher, or a coupon. Proposition losers can be debited a sum of money. In some embodiments, proposition losers do not pay a penalty. For example, users can participate in a sponsored competition in which users are invited to play at no cost for a chance to win a prize or reward. Sponsored competitions can be monetized through advertisements that are presented to users through the electronic gaming interface. Predictions, responses, propositions, wagers, and user account information can each be encrypted to prevent eavesdropping and maintain user confidentiality.

In some embodiments, a winner of a proposition and scoring based thereon is determined by an actual outcome of the live event being broadcast to users. In some embodiments, scoring is based on a simulated outcome of the live event. For example, a computer simulator determines a simulated outcome and users submit propositions regarding a simulated outcome. For example, users can compete by predicting a next play call by a simulated coach. The user can compete with other users via a scoring system or users can play independently by scoring against the gameplay system itself. A simulated outcome can be based on a probability that is calculated based on certain variables, such as live event inputs and statistical information compiled from external sources. In some embodiments, there is a degree of randomness in the determination of a simulated outcome such that the simulated outcome is not entirely dependent on probability calculations of statistics. In some cases, a simulated outcome of a live event differs from an actual outcome of the live event. Users can submit predictions of both a simulated outcome and an actual outcome. For example, scoring can differ based on whether a user predicted outcome matches a simulated outcome and an actual outcome.

In some embodiments, users must submit predictions or propositions within an allotted time, i.e., a submission deadline. For example, users must submit a prediction regarding the next play of a football game before the next snap. Example predictions regarding a football game include whether the next play is a run play or a pass play, the gain in yardage (e.g., greater than, less than, or equal to 10 yards), which player participant catches the ball, whether a turnover occurs, the type of turnover, the next play call by the coach or quarterback, etc. Example predictions regarding a basketball game include whether a player participant shoots or passes the ball, whether a player participant scores a free throw, points accumulated by a player participant, fouls accumulated by a player participant, etc. Example predictions regarding a baseball game include whether the batter strikes out, the pitch type (e.g., fastball, curveball, changeup, etc.), the pitch speed, etc. In some cases, users can submit a prediction through the duration of the live event as long as the prediction is submitted before the outcome is broadcasted, for example, regarding the overall winner or final outcome of the live event. For example, the submission deadline regarding the winner of a basketball game can range from tipoff time to 10 seconds before the end of the last quarter of game time is broadcasted. In some embodiments, the winning payout can vary based on the odds of the prediction. For example, the likelihood of correctly predicting the winner of a live event may increase as the live event progresses. Accordingly, the payout can be less when a prediction is submitted before the live event commences versus 10 seconds before the end of the live event.

In some embodiments, predictions are answers to multiple choice questions or a questionnaire. These propositions can be pre-set by the game operator. In some embodiments, users can create impromptu propositions or side bets with one or more co-users regarding a specific play or outcome of the live event. Accordingly, co-users can choose to accept or reject an impromptu proposition. In some embodiments, users can communicate with co-users through a messaging platform. In some embodiments, user propositions can be directed to the gaming system or the gaming operator (i.e., the "house").

Types of predictions regarding a live event can varying greatly depending on the live event, the game operator, and the users participating in the predictive game. Predictions can range from the final disposition of the live event to the next play of the live event, to player participant statistics or accomplishments during the live event, or to the next play call by the coach participant. For example, regarding a baseball game, predictions can be made on total runs scored by a particular player, number of errors made by a particular outfielder, fastest pitch speed by a particular pitcher, number of strikes by a particular batter. In some embodiments, a prediction is an action by a player participant in the live event. In some embodiments, a prediction is an action by a coach participant in the live event. In some embodiments, a prediction is an accomplishment by a participant in the live event. In some embodiments, a prediction is the overall winner or final outcome of the live event.

Computer Architectures and Systems

An aspect of the disclosure provides a system that is programmed or otherwise configured to implement the methods described herein. The system can include a computer server that is operatively coupled to an electronic device of a user.

FIG. 1 illustrates a computer system 100 programmed or otherwise configured to allow, for example, near synchronous transmission of an electronic representation of a live event to a plurality of users and management of user propositions associated with a prediction regarding the live event. The system 100 includes a computer server ("server") 101 that is programmed to implement methods disclosed herein. The server 101 includes a central processing unit (CPU) 102, which can be a single core or multi-core processor, or a plurality of processors for parallel processing. The server 101 also includes: a memory 103, such as random-access memory, read-only memory, and flash memory; electronic storage unit 104, such as a hard disk; communication interface 105, such as a network adapter, for communicating with one or more other systems; and peripheral devices 106, such as cache, other memory, data storage, and electronic display adapters. The memory 103, storage unit 104, interface 105, and peripheral devices 106 are in communication with the CPU 102 through a communication bus, such as a motherboard. The storage unit 104 can be a data storage unit or data repository for storing data. The server 101 can be operatively coupled to a computer network 107 with the aid of the communication interface 105. The network 107 can be the Internet, an internet or extranet, or an intranet or extranet that is in communication with the Internet. The network 107 in some cases is a telecommunications network or data network. The network 107 can include one or more computer servers, which can allow distributed computing, such as cloud computing. The network 107, in some cases with the aid of the server 101, can implement a peer-to-peer network, which can allow devices coupled to the server 101 to behave as a client or an independent server.

The storage unit 104 can store files, such as drivers, libraries, saved programs, and user information. The storage unit 104 can store history of records of propositions or wagers, statistical data or other additional supplemental information to assist predictions, live event information, for example, scoreboards and live event conditions. The storage unit 104 can also store user data, such as user profile, user account information, user transactions, user activity, user statistics, and user messages. The server 101, in some cases, can include one or more additional data storage units that are external to the server 101, such as located on a remote server that is in communication with the server 101 through an intranet or the Internet.

The server 101 can communicate with one or more remote computer systems through the network 107. In some embodiments, the server 101 is in communication with a first remote computer system 108 and a second remote computer system 109 that are located remotely with respect to the server 101. The first remote computer system 108 can be the computer system of a user, and the second remote computer system 109 can be an external data repository. In some embodiments, the system includes a plurality of first remote computer systems 108, for example, from a plurality of users of the system. The first remote computer system 108 and second remote computer system 109 can be, for example, personal computers, such as smart TVs; internet TVs; portable PCs; slate and tablet PCs, such as Apple® iPad and Samsung® Galaxy Tab; telephones; smartphones, such as Apple® iPhone, Android-enabled devices, Windows® Phone, and Blackberry®; smart watches, such as Apple® Watch; smart glasses, such as Google® Glass; or personal digital assistants. The user can access the server 101 via the network 107 to view an electronic display of systems disclosed herein.

In some embodiments, the system 100 includes a single server 101. In other situations, the system 100 includes multiple servers in communication with one another through an intranet or the Internet. The server 101 can be adapted to store live event information, such as, for example, statistical data, video and audio footage, venue conditions, and other information relevant to the live event. Such live event information can be stored on the storage unit 104 of the server 101.

Methods as described herein can be implemented by way of a machine or computer executable code, modules, or software stored on an electronic storage location of the server 101, such as, for example, on the memory 103 or electronic storage unit 104. During use, the code can be executed by the processor 102. In some embodiments, the code can be retrieved from the storage unit 104 and stored on the memory 103 for ready access by the processor 102. In some embodiments, the electronic storage unit 104 can be precluded, and machine executable instructions are stored on memory 103. Alternatively, the code can be executed on the second remote computer system 109. The code can be pre-compiled and configured for use with a processor adapted to execute the code, or can be compiled during runtime. The code can be supplied in a programming language that can be selected to allow the code to execute in a precompiled or as-compiled fashion.

All or portions of the software can at times be communicated through the Internet or various other telecommunications networks. Such communications can support loading of the software from one computer or processor into another, for example, from a management server or host computer into the computer platform of an application server. Another type of media that can bear the software elements includes optical, electrical, and electromagnetic waves, such as those used across physical interfaces between local devices, through wired and optical landline networks and over various air-links. The physical elements that carry such waves, such as wired or wireless links, or optical links, also can be considered as media bearing the software.

A machine readable medium, incorporating computer executable code, can take many forms, including a tangible storage medium, a carrier wave medium, and physical transmission medium. Non-limiting examples of non-volatile storage media include optical disks and magnetic disks, such as any of the storage devices in any computer. Volatile storage media include dynamic memory, such as a main memory of such a computer platform. Tangible transmission media include coaxial cables, copper wire, and fiber optics, including wires that comprise a bus within a computer system. Carrier wave transmission media can take the form of electric or electromagnetic signals, or acoustic or light waves such as those generated during radio frequency (RF) and infrared (IR) data communications.

Common forms of computer readable media include: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, and any other medium from which a computer can read programming code or data. Many of these forms of computer readable media can be involved in carrying one or more sequences of one or more instructions to a processor for execution.

The server 101 can be configured for: data mining; extract, transform, and load (ETL); or spidering operations, including Web Spidering. In Web Spidering, the system retrieves data from remote systems over a network and accesses an Application Programming Interface or parses the resulting markup. The process can permit the system to load information from a raw data source or mined data into a data warehouse.

Computer software can include computer programs, such as, for example executable files, libraries, and scripts. Software can include defined instructions that upon execution instruct computer hardware, for example, an electronic display to perform various tasks, such as display graphical elements on an electronic display. Software can be stored in computer memory.

Software can include machine executable code. Machine executable code can include machine language instructions specific to an individual computer processor, such as a CPU. Machine language can include groups of binary values signifying processor instructions that change the state of an electronic device, for example, a computer, from the preceding state. For example, an instruction can change the value stored in a particular storage location inside the computer. An instruction can also cause an output to be presented to a user, such as graphical elements to appear on an electronic display of a computer system. The processor can carry out the instructions in the order they are provided.

Software comprising one or more lines of code and output(s) therefrom can be presented to a user on a user interface (UI) of an electronic device of the user. Non-limiting examples of UIs include a graphical user interface (GUI) and web-based user interface. A GUI can allow a subject to access a display of the invention. The UI, such as GUI, can be provided on a display of an electronic device of the user. The display can be a capacitive or resistive touch display, a head-mountable display, such as a Google® Glass, or a virtual display. Such displays can be used with other systems and methods of the disclosure.

Methods of the disclosure can be facilitated with the aid of applications, or apps, which can be installed on an electronic device of the user. An app can include a GUI on a display of the electronic device of the user. The app can be programmed or otherwise configured to perform various functions of the system. GUIs of apps can display on an electronic device of the user. Non-limiting examples of electronic devices include computers, televisions, smart televisions, smartphones, tablets, and smart watches. The electronic device can include, for example, a passive screen, a capacitive touch screen, or a resistive touch screen. The electronic device can include a network interface and a browser that allows the subject to access various sites or locations, such as web sites, on an intranet or the Internet. The app is configured to allow the mobile device to communicate with a server, such as the server 101.

Any embodiment of the invention described herein can be, for example, produced and transmitted by a user within the same geographical location. Systems, products, or devices disclosed herein can be, for example, produced and/or transmitted from a geographic location in one country and a user of the invention can be present in a different country. In some embodiments, the data accessed by a system disclosed herein is a computer program product that can be transmitted from one of a plurality of geographic locations to a user. Data generated by a computer program product disclosed herein can be transmitted back and forth among a plurality of geographic locations, for example, by a network, a secure network, an insecure network, an internet, or an intranet. In some embodiments, data are encrypted. In some embodiments, a system herein is encoded on a physical and tangible product.

Further disclosed herein are computer systems that are programmed or otherwise configured to implement the methods described herein. Such computer systems include a predictive gaming system having various modules that execute the methods described herein. Non-limiting examples of modules of the gaming system include a streaming module, a proposition module, an outcome module, a banking module, and an analytics module.

Figure 2:
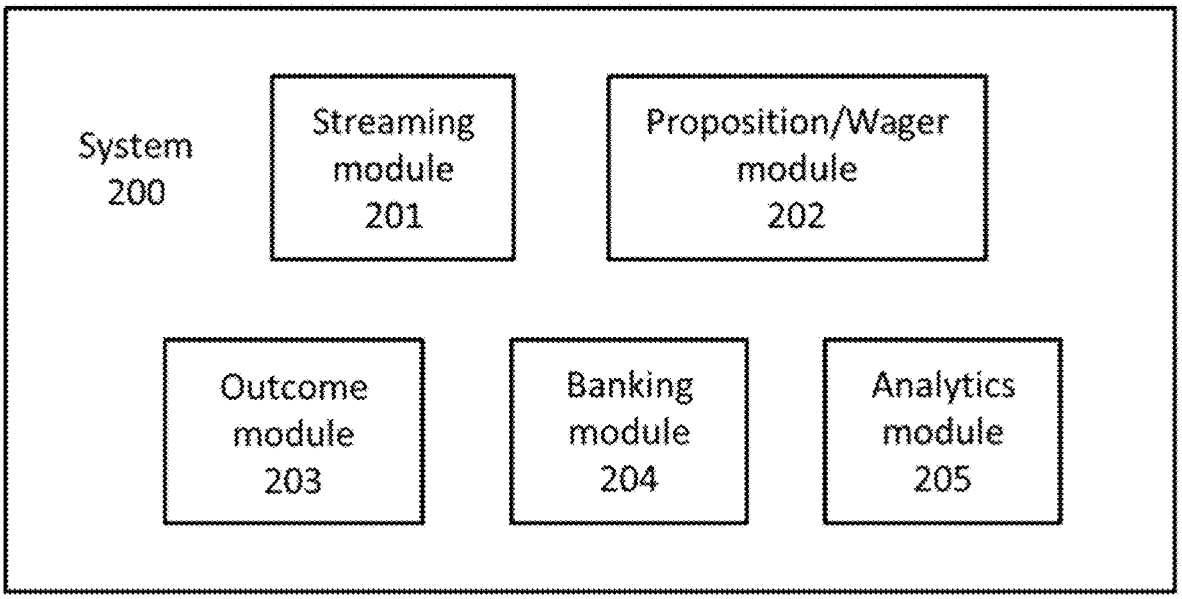
FIG. 2 illustrates a computer system for facilitating methods, systems, products, or devices described herein.

FIG. 2 illustrates a computer system 200 programmed or otherwise configured to allow, for example, execution of methods of a predictive gaming system described herein. The system 200 can include a streaming module 201, a proposition/wager module 202, an outcome module 203, a banking module 204, and an analytics module 205. Non-limiting examples of functions of these modules are described as follows.

The streaming module 201 executes methods associated with transmitting, receiving, streaming, and broadcasting of the electronic representation of the live event. The computer system electronically receives audio, video, and other sensory media data sets through a source, such as a camera or media sensor located at the live event. In some embodiments, sensory media data are generated from data inputs by a human operator (e.g., an official steward) located at the live event. Sensory data inputs can be transmitted to user devices communicatively coupled to a server. Live event sensors can compile live information from the event in real-time and transmit the data across a network to one or more devices that are communicatively coupled to the network. As a live event proceeds, sensors can detect live information and simultaneously (or contemporaneously) transmit the information to a plurality of users via user devices that are communicatively coupled to the network. In some embodiments, the live event and streaming of the live event can occur simultaneously or contemporaneously. In some embodiments, streaming of the live event occurs after the conclusion of the live event. The electronic representation of the live event can be a television broadcast or a live stream. In some embodiments, the electronic representation of the live event is a virtual representation of the live event. In some embodiments, the streaming module can execute methods associated with playback options or viewing options, thereby allowing users to create customized viewing experiences and engage in game analytics.

A proposition or wager module executes methods associated with transmitting, receiving, and processing propositions associated with a prediction regarding the live event. Further, the proposition module can execute transmission of a proposition from a user to a co-user. The proposition module further executes acceptance or rejection of the proposition by the co-user. Further, the proposition module can manage acceptance or rejection user propositions with respect to the submission deadline. In some embodiments, a proposition is a wager. In these embodiments, the module associates a prediction with a prize or sum of money. FIG. 2 depicts proposition/wager module 202, which can execute methods associated with transmitting, receiving, and processing propositions or wagers.

In some embodiments, a system includes a communication module that facilitates and manages communication between users, for example, electronic communication via direct instant messaging, group messaging, audio messaging, or video messaging. A communication platform fosters social interaction between users to encourage competition and user participation in the game. In some embodiments, the communication module manages communication between users and the game operator.

The outcome module 203 executes methods associated with processing an outcome of the live event and the outcome of a proposition or wager. The outcome module coordinates with the streaming module to determine the actual outcome. The outcome module determines whether a predicted outcome matches the actual outcome. In some embodiments, a game operator can override a mismatch between a predicted outcome and an actual outcome. In some embodiments, a user can protest an incorrect determination of a winning or losing prediction.

The banking module 205 executes methods associated with managing credits and debts of users with respect to user propositions associated with predictions regarding the live event. For example, the banking module can credit a prize, such as a sum of money, to a winner of a proposition or wager. Similarly, the banking module can debit a credit or a sum of money, from a loser of a proposition or wager. The banking module coordinates crediting and debiting transactions between users and the gaming system with the outcome of a live event and the outcome of a proposition or wager regarding the live event.

The analytics module 205 executes methods associated with transmitting, receiving, and manipulating supplemental information regarding the live event. The supplemental information can be transmitted to the predictive gaming system from multiple data collection or news sources. Non-limiting examples of supplemental information include statistical information, analytical information, historical data, participant/team information, event information, probabilistic modeling, risk analysis, availability of key players, participant/team fatigue, participant/team motivation, and news feeds. The supplemental information can be transmitted to users during transmission of the live event broadcast. In some embodiments, users can pay a subscription fee to gain access to supplemental information regarding the live event, for example, proprietary analytics. In some embodiments, supplemental information is provided to users at no cost. In some embodiments, users can manipulate supplemental information via the analytics module to generate predictive models or probabilistic calculations.

EXAMPLES

Example 1: Predictive Gaming System

Figure 3:
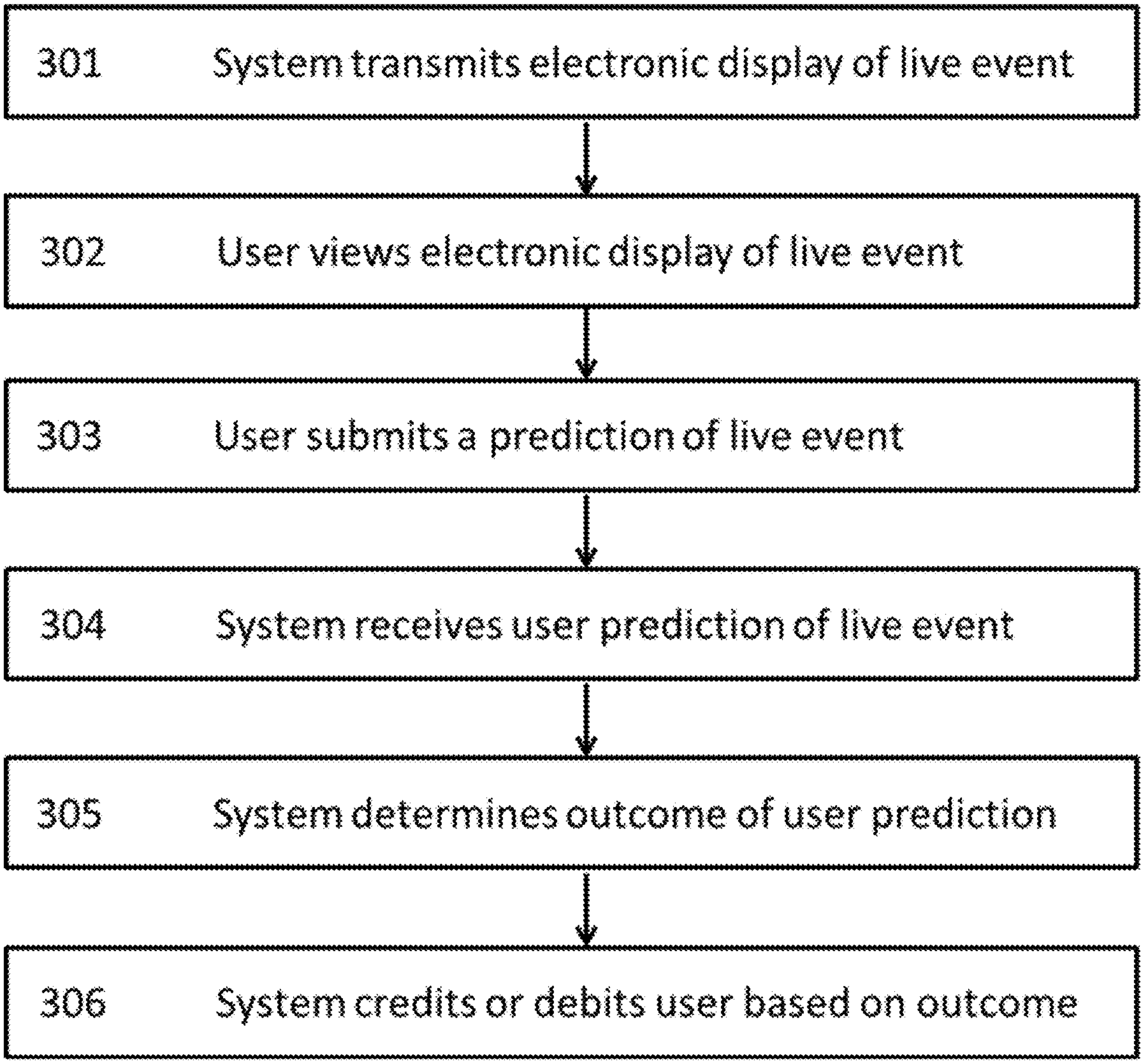
FIG. 3 illustrates a sequence of steps of a predictive gaming system described herein.

FIG. 3 illustrates a sequence of steps of a predictive gaming system described herein. The system transmits an electronic display of live event to one or more users of the system via user electronic devices 301. One or more users of the system views the electronic display of live event 302. One or more users of the system can electronically submit a prediction regarding the live event, or a proposition associated with the prediction regarding the live event 303, for example, through user electronic devices. The system receives user predictions or user propositions associated with a prediction 304. In some embodiments, users can consult, view, or request supplemental information provided by the system before submitting a prediction to the system. The system determines the outcome of the received user predictions, or user propositions associated with a prediction based on an outcome of the live event as the live event proceeds 305. Depending on whether a predicted outcome matches an actual outcome within the event, the system credits or debits users via electronic user accounts accordingly 306.

Figure 4:
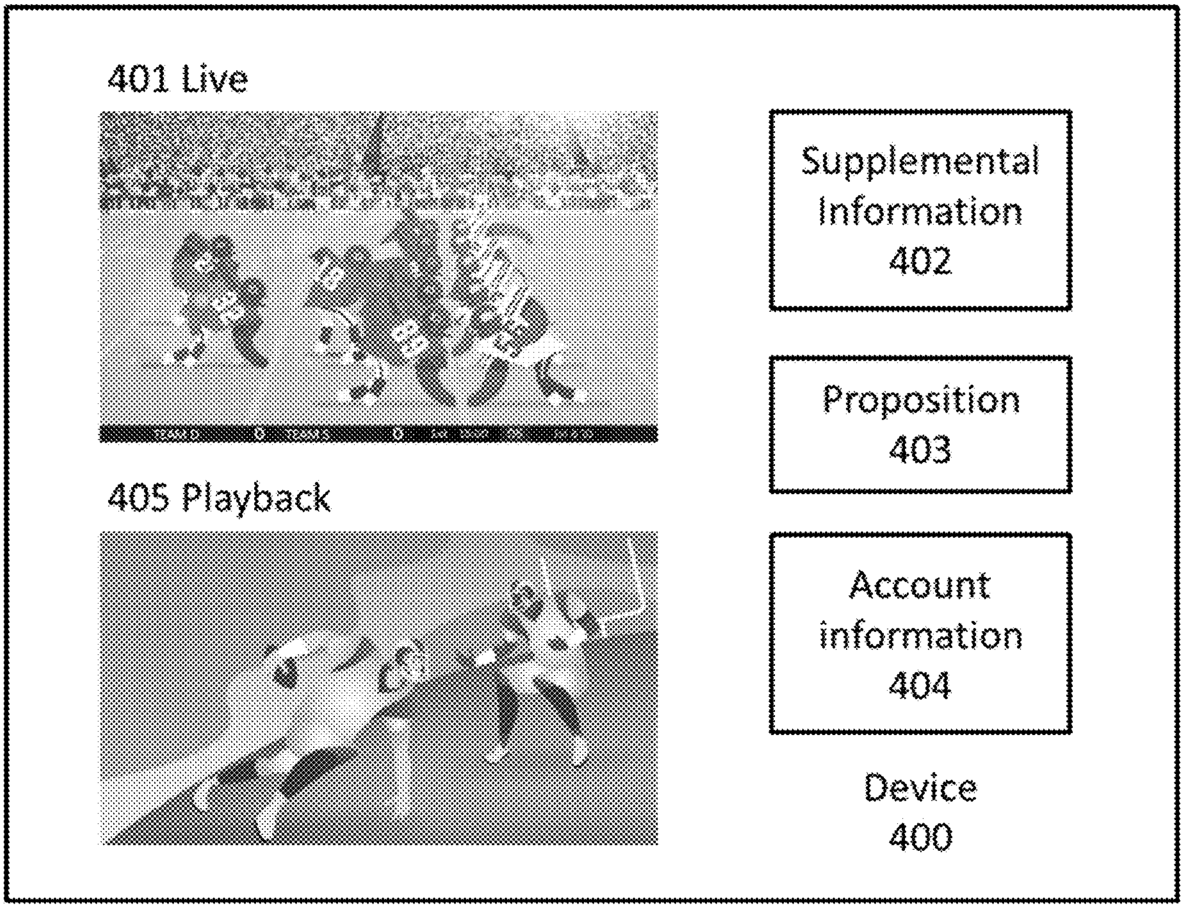
FIG. 4 illustrates an example electronic display of a predictive gaming system described herein.

FIG. 4 illustrates an example electronic display of the predictive gaming system described herein that is viewable on a user device 400. The electronic display includes an electronic representation of a live event 401, for example, an American football game. The display 401 includes live event information, for example, the game clock, the play clock, scoreboard, and player participant information. The electronic display 401 of the event can be transmitted or streamed live or deferred live, i.e., with or without broadcast delay.

Users can access, retrieve, or view additional or supplemental information regarding the event by selecting the supplemental information button 402. Supplemental information can assist users with the prediction. User can refer to supplemental information provided by the system prior to making or submitting prediction. In some embodiments, users may be charged a fee to access supplemental information. Non-limiting examples of supplemental information include statistical information, participant information, event information, and news feeds to assist users in making a potentially more accurate prediction.

Predictions or propositions associated with a prediction can be submitted by selecting the proposition button 403. In this module, users can create a proposition regarding an outcome. The propositions can be directed to a specific co-user, a plurality of co-users, or any users of the system. Proposition requests can be displayed in the form of a pop-up notification in the user display. Accordingly, co-users can opt to accept or reject a proposition request. In some embodiments, a prediction is associated with a prize or a sum of money.

Users can access, retrieve, or view user account information, including banking information and transactions, by selecting the account information button 404. In this module, users can track winnings, withdraw funds, and deposit funds.

In some embodiments, users can view the electronic display in playback mode 405 (playback display), for example, to analyze a previous play. In some embodiments, users can customize the live display to view different angles of the live event. Data transmitted from environmental sensors and video/audio footage are transmitted to user devices and viewable by the user.

Embodiments

Embodiment 1. A method of predictive gaming, the method comprising: a) transmitting to a plurality of users an electronic representation of a live event, wherein the transmitting of the electronic representation of the live event to the plurality of users is synchronous within a margin of error of a human reaction time; and b) receiving from a user of the plurality of users a prediction regarding the live event.

Embodiment 2. The method of embodiment 1, wherein the electronic representation is a television broadcast.

Embodiment 3. The method of embodiment 1, wherein the electronic representation is a live stream.

Embodiment 4. The method of embodiment 1, wherein the electronic representation is virtual.

Embodiment 5. The method of any one of embodiments 1-4, wherein the live event is a sporting event.

Embodiment 6. The method of any one of embodiments 1-4, wherein the live event is an esports event.

Embodiment 7. The method of any one of embodiments 1-4, wherein the live event is a team sporting event.

Embodiment 8. The method of any one of embodiments 1-7, wherein the prediction is of an action by a player participant in the live event.

Embodiment 9. The method of any one of embodiments 1-7, wherein the prediction is of an action by a coach participant in the live event.

Embodiment 10. The method of any one of embodiments 1-9, wherein the prediction is of an accomplishment by a participant in the live event.

Embodiment 11. The method of any one of embodiments 1-10, further comprising receiving from a co-user of the plurality of users a proposition associated with the prediction regarding the live event.

Embodiment 12. The method of embodiment 11, wherein the proposition is a wager.

Embodiment 13. The method of embodiment 11 or 12, further comprising determining a winner of the proposition.

Embodiment 14. The method of embodiment 13, further comprising granting a prize to the winner of the proposition.

Embodiment 15. The method of any one of embodiments 1-14, wherein the transmitting and the receiving occur through an electronic communication system.

Embodiment 16. A method of predictive gaming, the method comprising: a) receiving by a user an electronic representation of a live event; b) observing by the user the electronic representation of the live event, wherein the observing by the user is synchronous within a margin of error of no greater than a human reaction time with an observation of the live event by a co-user; and c) transmitting by the user to the co-user a proposition associated with a prediction regarding the live event.

Embodiment 17. The method of embodiment 16, wherein the electronic representation is a television broadcast.

Embodiment 18. The method of embodiment 16, wherein the electronic representation is a live stream.

Embodiment 19. The method of embodiment 16, wherein the electronic representation is virtual.

Embodiment 20. The method of any one of embodiments 16-19, wherein the live event is a sporting event.

Embodiment 21. The method of any one of embodiments 16-19, wherein the live event is an esports event.

Embodiment 22. The method of any one of embodiments 16-19, wherein the live event is a team sporting event.

Embodiment 23. The method of any one of embodiments 16-22, wherein the prediction is of an action by a player participant in the live event.

Embodiment 24. The method of any one of embodiments 16-22, wherein the prediction is of an action by a coach participant in the live event.

Embodiment 25. The method of any one of embodiments 16-24, wherein the prediction is of an accomplishment by a participant in the live event.

Embodiment 26. The method of any one of embodiments 16-25, further comprising receiving from the co-user an acceptance of the proposition associated with the prediction regarding the live event.

Embodiment 27. The method of any one of embodiments 16-26, wherein the proposition is a wager.

Embodiment 28. The method of any one of embodiments 16-27, further comprising receiving by the user a determination of a winner of the proposition.

Embodiment 29. The method of embodiment 28, further comprising receiving by the user a prize based on the user being the winner of the proposition.

Embodiment 30. The method of any one of embodiments 16-29, wherein the transmitting and the receiving occur through an electronic communication system.

Embodiment 31. A computer program product comprising a non-transitory computer-readable medium having computer-executable code encoded therein, the computer-executable code adapted to be executed to implement a method of predictive gaming, the method comprising: a) processing a predictive gaming system, wherein the predictive gaming system comprises: i) a streaming module; and ii) a proposition module; b) transmitting by the streaming module to a plurality of users an electronic representation of a live event, wherein the transmitting of the electronic representation of the live event to the plurality of users is synchronous within a margin of error of no greater than a human reaction time; and c) receiving by the proposition module from a user of the plurality of users a proposition associated with a prediction regarding the live event.

Embodiment 32. The computer program product of embodiment 31, wherein the electronic representation is a television broadcast.

Embodiment 33. The computer program product of embodiment 31, wherein the electronic representation is a live stream.

Embodiment 34. The computer program product of embodiment 31, wherein the electronic representation is virtual.

Embodiment 35. The computer program product of any one of embodiments 31-34, wherein the live event is a sporting event.

Embodiment 36. The computer program product of any one of embodiments 31-34, wherein the live event is an esports event.

Embodiment 37. The computer program product of any one of embodiments 31-34, wherein the live event is a team sporting event.

Embodiment 38. The computer program product of any one of embodiments 31-37, wherein the prediction is of an action by a player participant in the live event.

Embodiment 39. The computer program product of any one of embodiments 31-37, wherein the prediction is of an action by a coach participant in the live event.

Embodiment 40. The computer program product of any one of embodiments 31-39, wherein the prediction is of an accomplishment by a participant in the live event.

Embodiment 41. The computer program product of any one of embodiments 31-40, wherein the method further comprises receiving by the proposition module from another co-user of the plurality of users an acceptance of the proposition.

Embodiment 42. The computer program product of any one of embodiments 31-41, wherein the proposition is a wager.

Embodiment 43. The computer program product of any one of embodiments 31-42, wherein the predictive gaming system further comprises an outcome module, wherein the method further comprises determining by the outcome module a winner of the proposition based on an occurrence within the live event.

Embodiment 44. The computer program product of embodiment 43, wherein the predictive gaming system further comprises a banking module, wherein the method further comprises granting by the banking module a prize to the winner of the proposition.

What is claimed is:

1. A method of predictive gaming, the method comprising:

a) transmitting by a computer system to a plurality of users an electronic representation of a live sporting event, wherein the transmitted electronic representation of the live sporting event is synchronously received by the plurality of users within a margin of error of a human reaction time; and b) receiving from a user of the plurality of users by the computer system a proposition to compete against a co-user of the plurality of users, wherein the proposition is associated with a prediction regarding an outcome of the live sporting event.

2. The method of claim 1, wherein the electronic representation is a television broadcast.

3. The method of claim 1, wherein the electronic representation is a live stream.

4. The method of claim 1, wherein the electronic representation is virtual.

5. The method of claim 1, wherein the live sporting event is an esports event.

6. The method of claim 1, wherein the live sporting event is a team sporting event.

7. The method of claim 1, wherein the prediction is of an action by a player participant in the live sporting event.

8. The method of claim 1, wherein the prediction is of an action by a coach participant in the live sporting event.

9. The method of claim 1, wherein the prediction is of an accomplishment by a participant in the live sporting event.

10. The method of claim 1, wherein the proposition is a wager.

11. The method of claim 1, further comprising determining a winner of the proposition.

12. The method of claim 11, further comprising granting a prize to the winner of the proposition.

13. The method of claim 1, wherein the transmitting and the receiving occur through an electronic communication system.

14. The method of claim 1, further comprising receiving from the user of the plurality of users by the computer system a user prediction regarding the outcome of the live sporting event.

15. A method of predictive gaming, the method comprising:

a) synchronously receiving within a margin of error of a human reaction time by a plurality of users an electronic representation of a live sporting event; and b) transmitting by a user of the plurality of users to a co-user of the plurality of users a proposition to compete against the co-user, wherein the proposition is associated with a prediction regarding an outcome of the live sporting event.

16. The method of claim 15, wherein the electronic representation is a television broadcast.

17. The method of claim 15, wherein the electronic representation is a live stream.

18. The method of claim 15, wherein the electronic representation is virtual.

19. The method of claim 15, wherein the live sporting event is an esports event.

20. The method of claim 15, wherein the live sporting event is a team sporting event.

21. The method of claim 15, wherein the prediction is of an action by a player participant in the live sporting event.

22. The method of claim 15, wherein the prediction is of an action by a coach participant in the live sporting event.

23. The method of claim 15, wherein the prediction is of an accomplishment by a participant in the live sporting event.

24. The method of claim 15, further comprising receiving from the co-user an acceptance of the proposition associated with the prediction regarding the live sporting event.

25. The method of claim 15, wherein the proposition is a wager.

26. The method of claim 15, further comprising receiving by the user a prize based on the user being the winner of the proposition.

27. The method of claim 15, wherein the transmitting and the receiving occur through an electronic communication system.

28. The method of claim 15, further comprising transmitting by the user of the plurality of users a user prediction regarding the outcome of the live sporting event.

* * * * *